March 9, 1954  H. G. KLEMM ET AL  2,671,521
AIR INTAKE SYSTEM FOR TRACTORS
Filed May 8, 1951

Inventors
Herman G. Klemm
Richard W. Hautzenroeder
BY
Carlson, Pitzner, Hubbard & Wolfe
Attys.

Patented Mar. 9, 1954

2,671,521

UNITED STATES PATENT OFFICE 2,671,521

AIR INTAKE SYSTEM FOR TRACTORS

Herman G. Klemm, Birmingham, and Richard W. Hautzenroeder, Detroit, Mich., assignors to Harry Ferguson, Inc., Detroit, Mich., a corporation of Delaware Application May 8, 1951, Serial No. 225,246

2 Claims. (Cl. 180—90)

The present invention relates to air intake systems for supplying clean, fresh air to the carburetor of the internal combustion engine which ordinarily constitutes the power plant of a tractor or other self-propelling farm implement.

Present day tractors are generally patterned along similar constructional lines wherein the engine or power plant situated at the front of the vehicle is provided with a shield rather than an enclosing hood, which encloses only the upper regions of the engine and leaves the sides thereof exposed, and is separated from the driver's space by an instrument panel and steering column assembly.

The open-sided arrangement briefly outlined above provides, in effect, a "canopy" for the engine, the overlying cover portion being for the purpose of shielding or protecting the ignition system from moisture during inclement weather, for shielding the fuel tank and otherwise acting as a guard therefor, as well as for protecting the more delicate engine instrumentalities such as the control rods, electrical cables and the like from damage due to contact with falling or passing objects. The exposure of the engine sides is deemed desirable or necessary to enhance engine cooling characteristics as well as to provide for quick and easy access to the engine for purposes of inspection or adjustment during operation thereof.

Because of the usually impure character of the air in the immediate vicinity of a tractor when the latter is in operation, particularly when operating in dry weather upon dusty ground, it is essential that only filtered air be admitted to the carburetor for admixture with the fuel. Accordingly the intake opening of the carburetor is usually connected through a suitable conduit with a so-called air cleaner by means of which air, drawn into the cleaner through an air inlet, is screened and passed through a bath of oil or other liquid and is discharged through an outlet leading to the carburetor. Ordinarily such air cleaners are situated in the vicinity of the engine in a more or less exposed position, usually at one open side of the partial hood or shield which extends over the engine. Frequently this air cleaner is positioned immediately in front of the instrument panel on the engine side thereof. In such instances the air drawn into the cleaner from the engine side of the instrument panel is particularly dust laden inasmuch as the atmosphere in the vicinity of the engine is heavily congested with dirt and dust occasioned by numerous considerations. For instance, engine vibration is a factor that tends to stir up otherwise settleable material and the current of air created by the tractor fan serves to direct this material in the general direction of the air cleaner unit. Exhaust fumes and gases such as those which may issue from any "breather" regions of the engine due to faulty or loose connections also may contribute toward the impure atmosphere in the general region of the air cleaner. Furthermore, when the moving tractor, as a vehicle, enters upon a particularly dust laden region or scene of operations, the air cleaner, being in a forward exposed and unprotected position, gathers in a considerable quantity of the existing impurities. This phenomenon of tractor operation results in frequent clogging or saturation of the air cleaner.

Clogging of the air cleaner invariably necessitates a temporary cessation of operations while the cleaner unit is disassembled and the dust screen associated therewith is relieved of its accumulated contents. Saturation of the air cleaner is more serious in that the cleaner will, unknown to the operator, pass impure air containing gritty and abrasive particles through to the engine, thus in time irreparably damaging the same or shortening its useful life. When it is considered that many manufacturers issue instructions requiring the inspection and cleaning of the air cleaner twice daily during the operation of the tractor, it is not surprising, considering the human tendency of owners to disregard the manufacturer's instructions, that many tractors have a relatively short-lived existence.

The present invention is designed to overcome the above noted limitations that are attendant upon the use of tractors and toward this end it contemplates the provision of an intake conduit which is connected to the inlet opening of the conventional air cleaner and which is arranged to draw fresh air through a preliminary filter in a shielded location on the operator's side of the instrument panel in full view of the operator and in a position convenient for wiping away coarse particles that may accumulate on such filter. The advantages of such a construction will become more readily apparent as the following description ensues.

The provision of an air intake system of the character briefly outlined above being the principal object of the invention, a further object is to provide such a system which may be manufactured and installed as standard and integral equipment on a tractor or one which may be readily applied to existing tractors with but slight modification of the original tractor equipment.

Another object of the invention is to provide an air intake system for tractor engines which will not require relocation of the conventionally mounted air cleaner on the tractor chassis or one which will require no modification of the air cleaner whatsoever.

Other objects and advantages of the invention, not at this time enumerated, will become more readily apparent as the nature of the invention is better understood.

In the accompanying single sheet of drawings forming a part of this specification:

Figure 1:
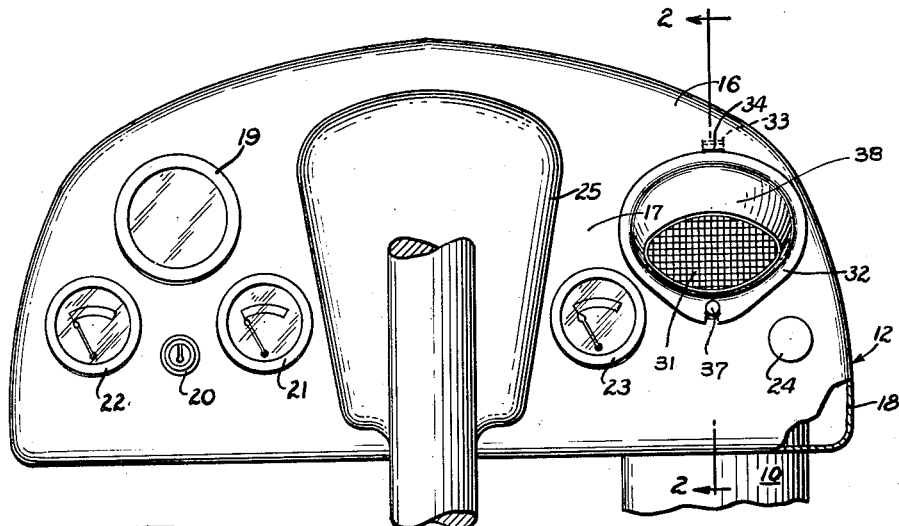
Fig. 1 is a front elevational view of a tractor instrument panel showing the improved air intake system applied thereto.
Figure 2:
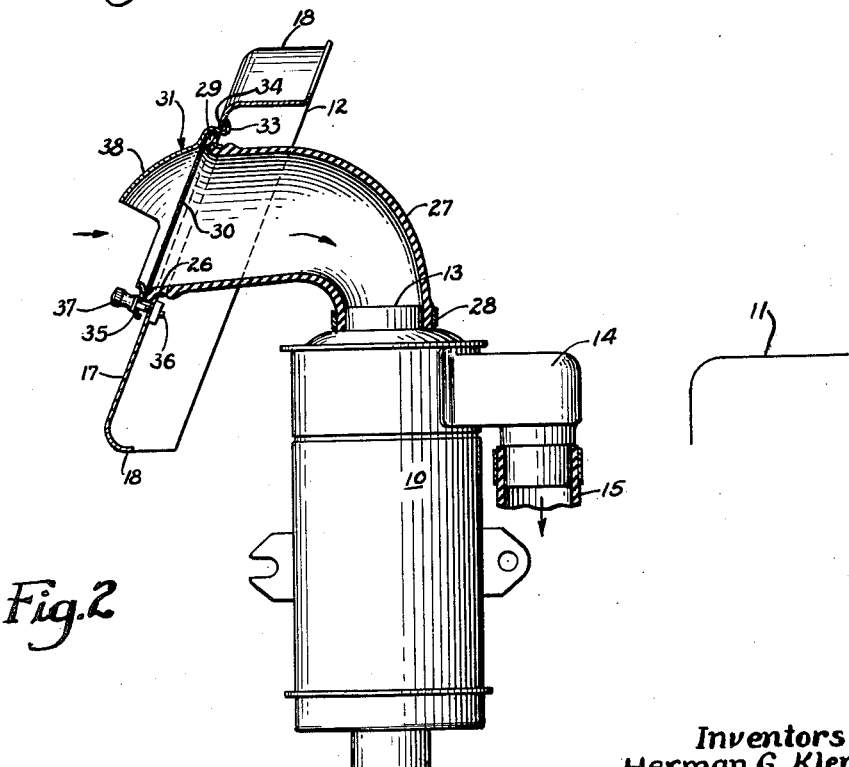
Fig. 2 is a sectional view taken substantially along the line 2—2 of Fig. 1.

While the invention is susceptible of various modifications and alternative constructions, there is shown in the drawings and will herein be described in detail the preferred embodiment, but it is to be understood that it is not thereby intended to limit the invention to the form disclosed, but it is intended to cover all modifications and alternative constructions falling within the spirit and scope of the invention as expressed in the appended claims.

Referring now to the drawings in detail, a conventional air cleaner 10 is shown as being mounted adjacent the rear end region of the space provided for the vehicle engine a portion of which has been shown at 11 and in front and to one side of the usual instrument panel assembly 12. The air cleaner 10 is provided with an air inlet connection 13 and an air outlet connection 14, the latter being operatively connected through a flexible conduit 15 to the intake side of the engine carburetor (not shown). The instrument panel assembly 12 includes a panel proper 16 preferably formed of sheet metal and having a generally flat central region 17 bounded by a laterally turned peripheral flange 18.

The usual panel instruments including a time meter 19, an ignition switch assembly 20, ammeter 21, temperature indicator 22, oil pressure gauge 23 and light switch 24 appear on the operator's side of the panel and these instrumentalities are all suitably mounted in openings provided for them on the panel. The panel assembly 12 is suitably supported from the vehicle steering column 25. The above instrumentalities and their arrangement on the panel assembly 12 are purely conventional and no claim is made here to any novelty associated with the same, the novelty of the present invention residing rather in the novel construction and combination of parts about to be more fully described.

An opening 26 is formed in the instrument panel 16 and is preferably centered above the oil pressure gauge 23 and light switch 24 at the right hand side of the panel as viewed in Fig. 1 where it is in full view of the operator or driver. The air intake connection 13 of the air cleaner 10 is connected by means of a flexible conduit 27 to the opening 26 and one end of the conduit 27 is secured by means of a removable clamp 28 to the inlet connection 13 while the other end of the conduit is flared as at 29 against the wall of the opening 26. A preliminary filter, herein shown as a circular screen 30 bears at its peripheral regions against the flared end 29 of the flexible conduit 27 and a hooded fixture 31 serves to removably clamp the dust screen 30 into position over the opening 26. The fixture 31 includes a substantially circular rim 32 having an ear or tongue 33 formed thereon designed for reception in a slot 34 provided in the panel 16 a slight distance above the opening 26. A hole or notch 35 is provided in a rim 32 at a region diagrammatically opposed from the tongue 33 and the sides of the notch are adapted to straddle a threaded stud 36 in order that the hooded fixture 31 may be removably secured in position by means of a clamping thumb nut 37. The fixture 31 includes a hood portion 38 which overlies the upper region of the opening 26 and partially conceals the screen 30 but which at the same time affords ample clearance for the ingress of fresh air through the opening 26 into the flexible conduit 27 and from thence to the intake connection 13 of the air cleaner 10. Note particularly that the hood portion 38 only partially conceals the screen 30 leaving a sufficient area visible so that the operator can readily detect undue accumulation of foreign material and remove it before the air intake is objectionably reduced.

From the above description it will be seen that the air intake system just described affords a means for drawing air designed for combustion purposes from a region in the vicinity of the tractor which is generally free from dust in that it is situated on the driver's side of the instrument panel assembly 12. Since the inlet end of the flexible conduit is screened by the provision of the preliminary filter 30, any large or coarse particles such as straw, leaves, or the like are collected thereon and effectively prevented from entering the air cleaner. Moreover, an accumulation of such coarse material is within full view of the driver who may conveniently wipe or brush it from the preliminary filter to prevent the reduction of the air supply to the tractor engine. In addition, cleaner air is supplied to the air cleaner 10 when the tractor is moving in a forward direction, as for example, during actual plowing, cultivating or other progressive operations, since any dust that may be stirred up by virtue of vibration of the vehicle engine or any sedimentary gases that may be exuded in the vicinity of the engine from the lubrication system thereof are diverted by the panel 16 and do not come in to the vicinity of the inlet opening 26 provided in the panel 16.

When it is desired to remove the dust screen 30 for cleaning or replacement it is merely necessary to remove the thumb nut 37, swing the hooded fixture 31 outwardly and upwardly and withdraw the tongue 33 from the slot 34. The dust screen 30 is thus accessible for removal purposes. It may be reapplied by a reversal of the process just described.

We claim as our invention:

1. The combination with a tractor having an instrument panel provided with an opening therein and an air cleaner unit mounted on the tractor engine and provided with an air inlet positioned forwardly of said instrument panel, of a flexible conduit having one end thereof in communication with said inlet, the other end of said conduit extending through said opening, said latter end of the conduit being provided with an outwardly flared rim overlapping the edges of said opening, a screen dimensioned to overlie said conduit rim, a cover plate having an aperture and a peripheral rim portion conforming in shape to the outwardly flared rim of said conduit and adapted to abut the marginal edge portion of said screen, and means for releasably clamping said cover plate to said instrument panel over said opening with its rim portion bearing against the marginal edge portion of said screen and the flared rim of said flexible conduit to maintain the latter in sealing relationship to the panel, there being a downwardly extending hood portion formed on said cover plate partially overlying said aperture but exposing a portion of the screen to direct view of the tractor operator.

2. For use with a tractor having an instrument panel having an aperture therein and located in the conventional manner rearward of the engine and in front of the driver with an unobstructed air space at the rear face of such panel, the combination of a finely apertured preliminary filter, means for supporting said preliminary filter in said aperture in the instrument panel and positioned so that the filter is presented to the view of the driver in position convenient for wiping away coarse particles that accumulate on it, a main filter adapted to be mounted on the engine, a conduit extending from the instrument panel forwardly of said preliminary filter to said main filter for conveying air sucked through the former into the latter, and an apertured fixture mounted over the aperture in the instrument panel and cooperating with said preliminary filter and said conduit to secure both to the instrument panel.

HERMAN G. KLEMM.
RICHARD W. HAUTZENROEDER.

References Cited in the file of this patent

UNITED STATES PATENTS

| Number | Name | Date |
|---|---|---|
| 1,500,031 | Phillips | July 1, 1924 |
| 1,863,015 | Kamrath | June 14, 1932 |
| 1,876,679 | Holmes | Sept. 13, 1932 |
| 2,197,503 | Martin | Apr. 16, 1940 |
| 2,203,407 | Donalson | June 4, 1940 |